May 24, 1932. W. H. KING ET AL 1,859,370
VARIABLE STROKE FEEDER
Filed Dec. 7, 1931
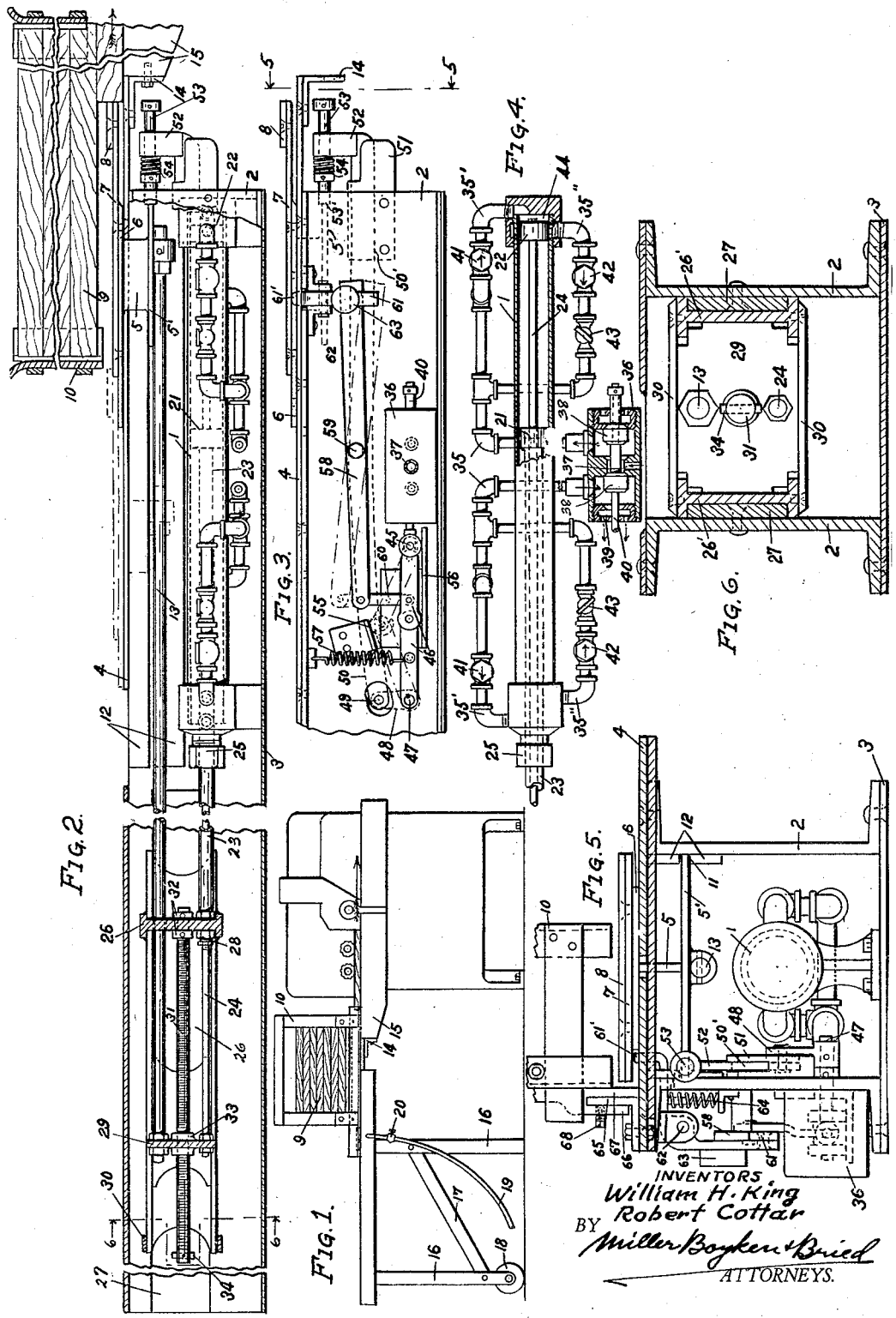
INVENTORS
William H. King
Robert Cottar
BY Miller, Boyken & Bried
ATTORNEYS.

Patented May 24, 1932

1,859,370

UNITED STATES PATENT OFFICE

WILLIAM H. KING AND ROBERT COTTAR, OF WEED, CALIFORNIA

VARIABLE STROKE FEEDER

Application filed December 7, 1931. Serial No. 579,446.

This invention relates to air-operated reciprocating feeding apparatus for feeding boards, blocks, or strips to various machines in which further operations on the strips are carried on. The objects of the invention are to provide an automatic air-operated feeder for the purpose mentioned which will be simple, rugged, reliable, free from objectionable jar or shock, and which will provide for easy change of stroke so that strips or blocks of various lengths may be fed with corresponding length of stroke of the feeder. Another object of the invention is a special construction whereby the feeder is a self-contained unit adapted for bolting or otherwise securing to any type of saw mill machine requiring a mechanical feeder in order to increase its output.

Other objects and advantages will appear in the following description and accompanying drawings.

In the drawings Fig. 1 is a side elevation of our improved feeder arranged adjacent a sticker and with a stack of munting strips or blanks being fed from below one at a time into the sticker.

Fig. 2 is an enlarged side elevation of the feeder shown with the forward enclosing channel frame member broken away, and partly in section.

Fig. 3 is a side elevation of the front end of Fig. 2 showing the reversing valve trip on the forward channel frame.

Fig. 4 is a plan view of the feeder cylinder, air piping and reversing valve, shown partly in section.

Fig. 5 is an enlarged view of the front end of the feeder as seen from the line 5—5 of Fig. 3.

Fig. 6 is an enlarged cross section of the rear end of the feeder as seen from the line 6—6 of Fig. 2.

In further detail the apparatus comprises a long air cylinder 1 rigidly mounted between two channel irons 2 forming side frame members, and which channels are tied together by a lower plate 3, and an upper plate 4, the latter being longitudinally slotted for passage and travel of a feeder shoe 5 which carries shoe plate 6 above plate 4 and on top of which shoe plate is adjustably secured a feeder plate 7 provided at its extreme end with a transversely extending plate 8 to form an abutment for feeding blocks or strips 9 of lumber superimposed in an aligning rack or magazine 10 mounted above the feeding end of the apparatus. Sliding shoe 5 is provided with a transversely extending portion 5' slidably supported at 11 in guides 12 secured along the inner sides of the channels and is reciprocated by a longitudinally extending connecting rod 13 in the manner to be described.

The front end of the feeder frame is provided with an extending bolting angle plate 14 for securing it to the saw mill machine which it is to serve, such as the sticker 15, and the main support of the feeder may consist of legs 16 braced as at 17 and fitted with rollers as at 18 to facilitate portability if desired, while extending to any convenient source of air pressure is a flexible hose 19 for operating the feeder, and valved at 20 for starting and stopping it.

The operating mechanism is as follows: Within cylinder 1 are two air pistons 21 and 22 fitted with suitable piston rings not shown. Piston 21 is secured at the end of a hollow piston rod 23 and piston 22 is secured at the end of a smaller piston rod 24 passing through the hollow rod. A stuffing box 25 serves to keep rod 23 tight where it emerges from the cylinder, and this rod extends to and secures at its end to a cross head 26 provided with long side members 26' slidably supported on guides 27 secured to the inner walls of the channels 2, while the small piston rod 24 extends through a stuffing box 28 at the end of the hollow rod and continues on for a distance and is secured at its end to a block 29 slidably supported at its corners on the elongated cross head members 26' as best shown in Fig. 6. Transverse members 30 shown secured to members 26' in this view are for tying or properly spacing the rearward ends of members 26' which would otherwise be free. (See Fig. 2 also for these tie pieces 30).

Connecting rod 13 passes freely through an opening in cross head 26 and extends to sliding block 29 to which it is bolted or otherwise secured as shown best in Fig. 2.

Means is provided for adjusting the distance between block 29 and cross head 26 for varying the feeding stroke and this is here shown as a threaded rod 31 rotatably mounted in cross head 26 and kept from longitudinal movement relative thereto by means of two collars 32. This threaded rod passes through and engages a threaded hub 33 formed on sliding block 29 and the extreme rearward end of the rod 31 is provided with a cross pin 34 or squared so that a socket wrench may be applied to turn it in either direction for drawing the block and cross head closer together or moving them apart. When the block and cross head are thus adjusted it is evident that the two pistons 21 and 22 within the cylinder are likewise adjusted and locked in any position relative to one another.

It will be seen that since the connecting or feeder rod 13 is connected through block 29 with rod 24 of piston 22 that the feeder plate will always advance to the same point upon the feeding stroke of the apparatus as piston 22 will always travel to the right-hand end of the cylinder, or substantially so as shown in Fig. 4, but that upon return stroke its travel will be limited by the separation of the pistons as this determines when piston 21 will reach its end of the cylinder, and therefore the return stroke may be varied to suit the length of material being fed.

Air is admitted and exhausted from opposite ends of the cylinder by piping 35 shown in Fig. 4 which is controlled by a reversing valve 36 which receives the operating air under pressure at 37 and by means of the double plunger valve 38 delivers it to either end of the cylinder while exhausting it from the other in the well-known manner of such valves without going into unnecessary details of construction. In the position shown in Fig. 4 the air is passing to the forward end of the cylinder for the beginning of the return stroke and exhausting at the rear end of the valve at 39 from the rear end of the cylinder, and upon pulling back of the valve rod 40 the reverse action will take place.

The air piping to opposite ends of the cylinder is the same for each end and is divided into two branches 35′, 35″, the former opening into the extreme end of the cylinder ahead of the piston, while the latter opens into the side of the cylinder in a position to be closed off by the piston before reaching the end of the cylinder as shown in Fig. 4. Branch 35′ is fitted with a check valve 41 permitting admission of air to the cylinder only, and branch 35″ is fitted with a check valve 42 permitting exhaust only, also a control valve 43 which may be set to determine the speed of the exhaust and therefore the speed of the feeder movement, the setting of these two valves 43 at opposite ends of the cylinder making it possible to get any desired relation of speeds of feed and return strokes.

Upon either piston nearing its end of the cylinder it cuts off its exhaust 35″ and cushions itself against shock by the air confined at 44.

To automatically trip the reversing valve 36 at opposite ends of the stroke the following mechanism is employed:

Valve rod 40 is pivotally connected at its rear end at 45 with one end of a pair of toggle links 46, the rear pivot 47 is fixed to the rear link, pivotally supported in the channel frame 2 and provided with a small upwardly extending crank 48 pivotally connected at 49 with the rear end of a horizontally extending bar 50, the forward portion 50′ of which is loosely slidable in a guide 51 and provided with an upwardly extending lug 52 fitted with a loose pin 53 horizontally slidable through a hole in lug 52 and provided with collars as shown on both sides of the lug to limit its sliding therethrough, and surrounding the pin at the rear side of lug 52 is a compression spring 54 normally urging the pin rearward. The inner end 53′ of this pin projects into the path of travel of reciprocating shoe member 5′ so that upon the forward end of the shoe movement it will compress spring 54 as shown in Fig. 1 and thereby put an increasing pressure on lug 52 and snap the toggle links 46 from dotted position of Fig. 3 resting against stop 55 to the full line position resting on stop 56 and against the pull of a spring 57 tending to snap the links back to dotted position. The links are held in the down position through means of a latch device comprising a lever 58 pivoted at 59 to the side of the channel iron frame and link at 60 to one of the toggle links. The forward end of this lever 58 is held up by a snap hook 61 shaped like a bell crank and pivoted at 62 to the frame and with its upper end 61′ projecting freely upward through a hole in frame plate 4 so as to be in the path of the strips of material falling from the magazine 10 as they fall upon each withdrawal of the feeder plate 7 so that as a new strip falls into place it will strike the end 61′ of the hook and throw the hooking portion 61 outward to release lever 58 and thus permit toggle links 46 to fly up under tension of spring 57, slide rod 40, and reverse the position of the air valve.

Snap catch or lever 61 may be weighted as at 63 and/or fitted with a light compression spring 64 to force it toward lever 58 to spring thereunder the moment the lever rises high enough.

The magazine 10 overhangs the reciprocating feeder plates 7, 8 as shown in Fig. 5 and is simply hooked in place to an angle iron 65 secured to the frame of the machine, the lower ends of the magazine sides being formed with forked ends 66, 67 so as to fit nicely over the vertical leg of the angle and to which it may be clamped by any suitable means such as the set screw 68.

Having thus described our improved feeder it will be seen to be a portable machine, adapted to be attached to or cooperate with any mill machine requiring a feeder, and that it operates automatically without shock at any stroke, that the stroke may be varied at will, and that magazines of any length or size may be quickly placed in position or removed.

We claim:—

1. A reciprocating feeder comprising an elongated frame, a power cylinder mounted longitudinally on the frame, a pair of pistons within said cylinder, rods extending concentrically from said pistons and cylinder, a cross head to which one of said rods is secured, a slidable block to which the other rod is secured, means for adjustably separating said cross head and block, and a feeder shoe secured to the block for reciprocation therewith.

2. In a construction as specified in claim 1, said cross head provided with an elongated body and said block slidably mounted on said body.

3. In a construction as specified in claim 1, reversing valve means for admitting an actuating fluid to either end of said cylinder, and a trip for said valve operated by said shoe at the end of its stroke.

4. In a construction as specified in claim 1, reversing valve means for admitting an actuating fluid to either end of said cylinder, a trip for said valve operated by said shoe at the end of its stroke, and means for tripping said reversing valve at the end of the return stroke.

5. In a construction as specified in claim 1, reversing valve means for admitting an actuating fluid to either end of said cylinder, a trip for said valve operated by said shoe at the end of its stroke, and means for tripping said reversing valve at the end of the return stroke comprising automatic means tending normally to reverse the valve, a latch holding said automatic means dormant, and a release for said latch in the path of material delivered to the feeder.

WILLIAM H. KING.
ROBERT COTTAR.